(12) United States Patent
Imbert

(10) Patent No.: US 12,195,684 B2
(45) Date of Patent: Jan. 14, 2025

(54) METHOD TO MITIGATE FOULING IN A HYDROCARBON PLANT

(71) Applicant: BL TECHNOLOGIES, INC., Minnetonka, MN (US)

(72) Inventor: Steven Imbert, Herentals (BE)

(73) Assignee: BL Technologies, Inc., Minnetonka, MN (US)

( * ) Notice: Subject to any disclaimer, the term of this patent is extended or adjusted under 35 U.S.C. 154(b) by 440 days.

(21) Appl. No.: 17/603,055

(22) PCT Filed: Apr. 9, 2020

(86) PCT No.: PCT/US2020/027400
§ 371 (c)(1),
(2) Date: Oct. 12, 2021

(87) PCT Pub. No.: WO2020/210441
PCT Pub. Date: Oct. 15, 2020

(65) Prior Publication Data
US 2022/0186129 A1   Jun. 16, 2022

Related U.S. Application Data

(60) Provisional application No. 62/833,122, filed on Apr. 12, 2019.

(51) Int. Cl.
*C10G 75/04* (2006.01)
*B01D 3/42* (2006.01)
(Continued)

(52) U.S. Cl.
CPC ............... *C10G 75/04* (2013.01); *B01D 3/42* (2013.01); *B01D 3/4283* (2013.01);
(Continued)

(58) Field of Classification Search
CPC .................. B01D 3/42–4294; C10G 75/04
See application file for complete search history.

(56) References Cited

U.S. PATENT DOCUMENTS 4,319,063 A * 3/1982 Dvoracek ............... C10G 9/16
507/90
5,734,098 A * 3/1998 Kraus ................... G01N 29/036
73/61.62

(Continued)

FOREIGN PATENT DOCUMENTS

| GB | 1122710 A | 8/1968 |
|----|-----------|--------|
| WO | 2018104443 | 6/2018 |

OTHER PUBLICATIONS

First Office Action, dated Nov. 18, 2023, received in connection with CN Patent Application No. 2020800276301 (and English translation).

(Continued)

*Primary Examiner* — Jonathan Luke Pilcher
(74) *Attorney, Agent, or Firm* — Meunier Carlin & Curfman LLC

(57) ABSTRACT

Described herein are systems and methods of fouling mitigation in a hydrocarbon fractionation column. The methods correlate operating parameters of the fractionation column, specifically flow rate and temperature, with fouling. The methods can include measuring a temperature and a flow rate at a bottom stream of the hydrocarbon fractionation column; providing the measured temperature and flow rate to a processing device; determining, by the processing device, based on the measured temperature and flow rate of the bottom stream, an antifoulant treatment protocol for the hydrocarbon fractionation column; and treating the hydrocarbon fractionation column by controlling, by the process- (Continued)

ing device, a feed control unit in accordance with the determined antifoulant treatment protocol.

4 Claims, 9 Drawing Sheets

(51) Int. Cl.
  *C10G 7/12* (2006.01)
  *G05D 21/02* (2006.01)
(52) U.S. Cl.
  CPC .......... *B01D 3/4294* (2013.01); *C10G 7/12* (2013.01); *G05D 21/02* (2013.01); *C10G 2300/4075* (2013.01)

(56) References Cited

U.S. PATENT DOCUMENTS

| | | | | |
|---|---|---|---|---|
| 8,604,140 | B2* | 12/2013 | Nagai | C08L 71/02 526/74 |
| 9,416,325 | B2* | 8/2016 | Brons | G01F 3/00 |
| 2008/0116051 | A1* | 5/2008 | Miller | C10G 11/187 702/179 |
| 2010/0163461 | A1* | 7/2010 | Wright | C10G 29/10 73/61.41 |
| 2012/0095167 | A1* | 4/2012 | Nagai | C08F 210/16 502/1 |
| 2012/0160015 | A1 | 6/2012 | Ovalles et al. | |
| 2014/0275663 | A1 | 9/2014 | Brons | |

OTHER PUBLICATIONS

International Search Report and Written Opinion dated Jul. 13, 2020, from International Application No. PCT/U2020/027400, 13 pages.
Chinese Application No. 2020800276301; Decision of Rejection issued Oct. 18, 2023.
Office Action in connection to Taiwan Application No. 109110546, dated Apr. 2, 2024.

* cited by examiner

| Bottom temperature °F (°C) | Fouling potential |
|---|---|
| < 185 (<85°C) | Low |
| 185 - 200 (85 - 100 °C) | Moderate |
| 200 - 250 (> 100°C) | High |

METHOD TO MITIGATE FOULING IN A HYDROCARBON PLANT

CROSS-REFERENCE TO RELATED APPLICATIONS

This application is a U.S. National Phase Patent Application of International Patent Application Number PCT/US2020/027400, filed on Apr. 9, 2020, which claims benefit of U.S. Provisional Application No. 62/833,122, filed Apr. 12, 2019, which are hereby incorporated herein by reference in their entirety.

FIELD OF THE INVENTION

The disclosure relates to methods of mitigating fouling, particularly mitigating fouling in a hydrocarbon plant.

BACKGROUND OF THE INVENTION

Ethylene (C2H4) is one of the largest volume chemical produced over the globe and is the "building block" for most of the downstream petrochemical processes. The large scale production of ethylene is carried out by Pyrolysis (cracking) of hydrocarbon feedstocks in the presence of steam in large, multiple pyrolysis furnaces and subsequent separation of the resultant gas mixture through a complex sequence of unit operations. Ethylene plants are originally designed to crack a particular feedstock—LPG (ethane, propane, butane) or liquid feed (naphthas, condensates, gas oils). FIG. 1 shows in basic concept a block flow diagram for liquid cracking plant. Olefin plant can be subdivided into the following major sections—Cracking and Quench, Compression and Treating, Drying and Chilling, and Product Separations.

The product separations area of an olefins plant includes a number of distillation columns and reactors. They are used to purify and separate the cracked gas into polymer grade ethylene and propylene. Most plant designs, i.e., Kellogg, Lummus, Stone and Webster, are based on front-end demethanization. Other designs can be based on front-end depropanization. In most ethylene units, the following equipment is included in the product purification section: C1-C4 columns and reboilers, acetylene and propadiene converters, a C2 splitter, and a C3 splitter. In the demethanizer, methane and remaining hydrogen product is taken overhead. The recovered methane becomes fuel for the cracking furnace operation. Hydrogen is recycled back to the cold box where it is further purified and used in the acetylene and propadiene converters. There is usually no process fouling problems in the demethanizer due to its very low operations temperatures. The deethanizer splits the ethylene and ethane overhead. The C2 stream is sent through an acetylene converter where residual acetylene is converted to ethylene and ethane. In the C2 splitter, polymer grade ethylene is taken overhead and the bottoms product ethane is usually recycled back to a cracking furnace. The deethanizer column is usually the first area where polymer fouling may be noted. Typically, column fouling is minor, but reboiler fouling can be quite severe. The depropanizer column splits C3s overhead. The overhead product is then sent through the methylacetylene/propadiene (MAPD) converter. After treatment, the C3 splitter separates propylene overhead from a propane bottoms product. Propane is either used for fuel or is cycled back to a cracking furnace. The depropanizer is usually the first column where severe tray and reboiler fouling becomes evident. Some of the more modern plants have installed a separate depropanizer column bottoms section in anticipation of severe fouling due to polybutadiene. Peroxides, metals, and heat initiate polymer reactions. In the debutanizer, the mixed C4s (butadiene, butene and butanes) are taken overhead. The overhead product becomes feed to a butadiene extraction/recovery plant. Some problems have been noted with polymerization in the debutanizer overhead condensers, column and reboilers. Plants that utilize an antifoulant program in the upstream depropanizer usually have minor problems with debutanizer system fouling.

Current practice for controlling fouling in columns and reboilers includes measuring the residual presence of various antifoulants at various points in the process stream. This practice requires retrieving samples and getting analysis (typically extraction spectrophotometry and GC analysis). Thus the samples must be collected, sent for testing and the results analyzed before adjustments can be made to the feed. Because frequent sampling and laboratory analysis are required, the current practice can become expensive and time consuming. As such, a means that obviate delayed off site analysis and provides for real time control of antifoulant addition would enable more efficient operation of a steam cracker. The systems and methods disclosed herein address these and other needs.

SUMMARY OF DISCLOSURE

Disclosed herein are systems and methods of rapidly evaluating fouling or fouling potential and mitigating fouling in a hydrocarbon fractionation column. Particularly, the inventor has discovered that fouling in a hydrocarbon fractionation column can be correlated to measured operating parameters of the fractionation column, specifically to the flow rate and temperature at the bottom of the fractionation column. These parameters are continuously measured in the typical operation of a refinery and thus may be readily available. The inventor has further developed an algorithm based on the temperature and flow rate data that controls the feeding of antifoulants (inhibitors) to the hydrocarbon fractionation column. Thus, this invention obviates delayed on or off site analysis and provides for real time control of anti-foulant addition. This invention also maximizes feed efficacy and minimizes antifoulant wastage. The methods and systems described herein are applicable to any hydrocarbon fractionation column, for example, a condensate stripper, a deethanizer, a depropanizer, or a debutanizer. In specific examples, the methods and system described herein can be used in an ethylene fractionation train.

In some aspects of the methods disclosed herein, methods of fouling mitigation in a hydrocarbon fractionation column can comprise a) measuring a temperature and a flow rate at a bottom stream of the hydrocarbon fractionation column; b) providing the measured temperature and flow rate to a processing device; c) determining, by the processing device, based on the measured temperature and flow rate of the bottom stream, an antifoulant treatment protocol for the hydrocarbon fractionation column; and d) treating the hydrocarbon fractionation column by controlling, by the processing device, a feed control unit in accordance with the determined antifoulant treatment protocol.

The temperature can be measured at the bottom or at the outlet of the reboiler of the hydrocarbon fractionation column. The flow rate can be measured at the bottom of the hydrocarbon fractionation column.

The determined antifoulant treatment protocol (i.e., the amount of antifoulant to be added to the hydrocarbon fractionation column) can be determined according to the equation:

$$1/h_{(column\ x)} = M + (x - y*A) + (B - w)*z,$$

wherein $1/h_{(column\ x)}$ is the antifoulant flow rate in the column (in units of l/h);

M is a minimum antifoulant dosage in units of l/h;

A is a bottom flow rate (T/h);

B is an outlet temperature (° C.);

x and y are specific parameters that determine the impact of A (bottom flow rate) on the antifoulant flow rate (l/h);

z and w are specific parameters that determine the impact of B (outlet temperature) on the antifoulant flow rate (l/h).

Treating the hydrocarbon fractionation column by controlling, by the processing device, the feed control unit in accordance with the determined antifoulant treatment protocol can comprise the feed control unit adding an antifoulant to the hydrocarbon fractionation column. For instance, the feed control unit can comprise a pump which receives an electrical signal corresponding to the determined antifoulant treatment protocol, preferably a calculated dosage of antifoulant, the pump having a controller to vary its pumping rate, the controller varying the pumping rate of the antifoulant being pumped directly into the hydrocarbon fractionation column as a result of receiving the electrical signal. Suitable examples of antifoulants include a dialkylhydroxylamine, a diarylhydroxylamine, a hydroxyalkylhydroxylamine, a hydroxylalkyl hydroxylamine, an alkylated hydroxytoluene, an aryldiamine, a hydroxyalkylpiperidinoxyl, or a mixture thereof. The antifoulant is preferably added upstream the hydrocarbon fractionation column.

In some aspects of the systems disclosed herein, systems for fouling mitigation can comprise a) a hydrocarbon fractionation column; b) one or more analyzers, wherein the one or more analyzers measure a temperature and a flow rate of a bottom stream in the hydrocarbon fractionation column; and c) a processing device in communication with the analyzer and a feed control unit, wherein the processing device: i) receives the measured temperature and flow rate from the one or more analyzers; ii) determines, based on the measured temperature and flow rate in the stream, an antifoulant treatment protocol for the hydrocarbon fractionation column; and iii) treats the hydrocarbon fractionation column by controlling the feed control unit in accordance with the determined antifoulant treatment protocol. A plurality of hydrocarbon fractionation columns may be present in the systems. The plurality of hydrocarbon fractionation columns can be controlled by the same or separate processing devices.

In other aspects of the systems disclosed herein, the systems for fouling mitigation can comprise a non-transitory computer program product comprising computer-executable control logic for executing by a processor. When executed, the computer-executable control logic can cause the processor to: a) receive, from an analyzer, measured temperature and flow rate for a bottom stream of a hydrocarbon fractionation column; b) determine, based on the measured temperature and flow rate in the stream, an antifoulant treatment protocol for the hydrocarbon fractionation column; and c) treat the hydrocarbon fractionation column by controlling a feed control unit in accordance with the determined antifoulant treatment protocol.

Computer-assisted method of fouling mitigation in a hydrocarbon fractionation column are also provided herein. The computer in the computer-assisted method of fouling mitigation can comprise at least one processing device and a non-transitory memory unit comprising a control logic that, when executed by the at least one processing device, causes the at least one processing device to perform the methods disclosed herein. In particular, the processing device can perform the method comprising a) measuring, by at least one analyzer, a temperature and a flow rate in a bottom stream from the hydrocarbon fractionation column; and b) providing the measured temperature and a flow rate to the processing device, wherein based on the measured temperature and flow rate in the bottom stream, the processing device executes, by the control logic, an antifoulant treatment protocol for the hydrocarbon fractionation column comprising controlling a feed control unit in accordance with the determined antifoulant treatment protocol. The processing device can be integrated with and/or into the at least one analyzer or the feed control unit.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

DRAWINGS

The accompanying drawings, which are incorporated in and constitute a part of this specification, illustrate embodiments and together with the description, serve to explain the principles of the methods and systems:

Figures 5A, 5B:
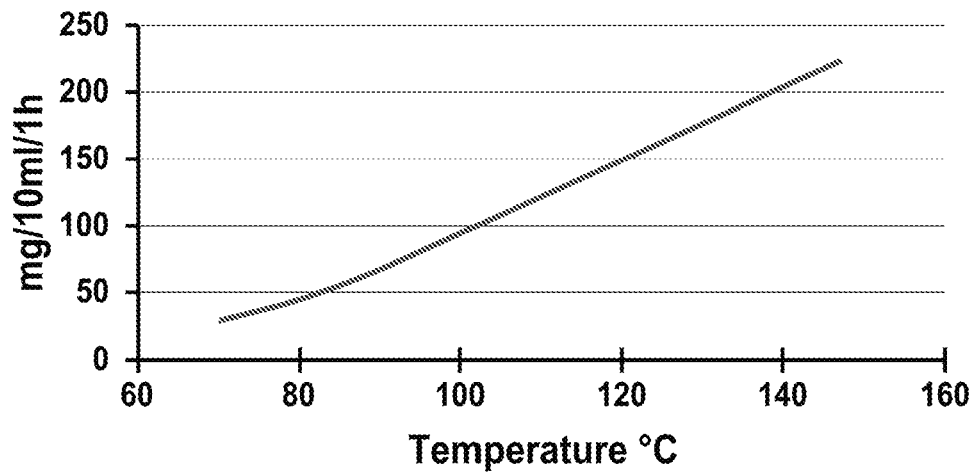
Figure 5C:
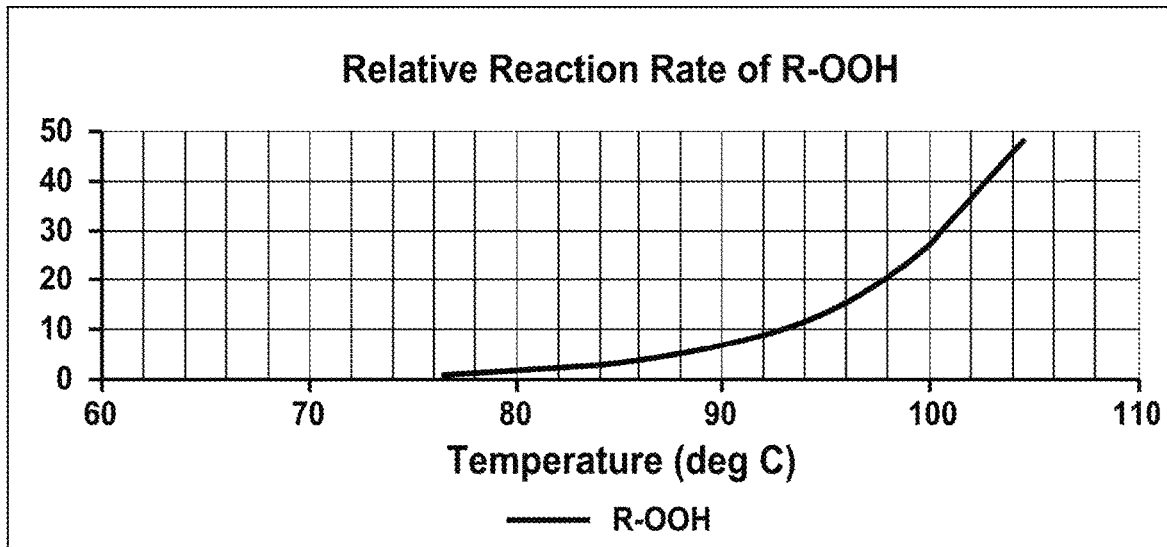

FIGS. 5A-5C depict the effect of temperature on fouling rates. FIGS. 5A and 5B show the effect of temperature on the severity of fouling. FIG. 5C shows the effect of temperature on the relative reaction rates of R—OOH compounds.

Figure 6A:
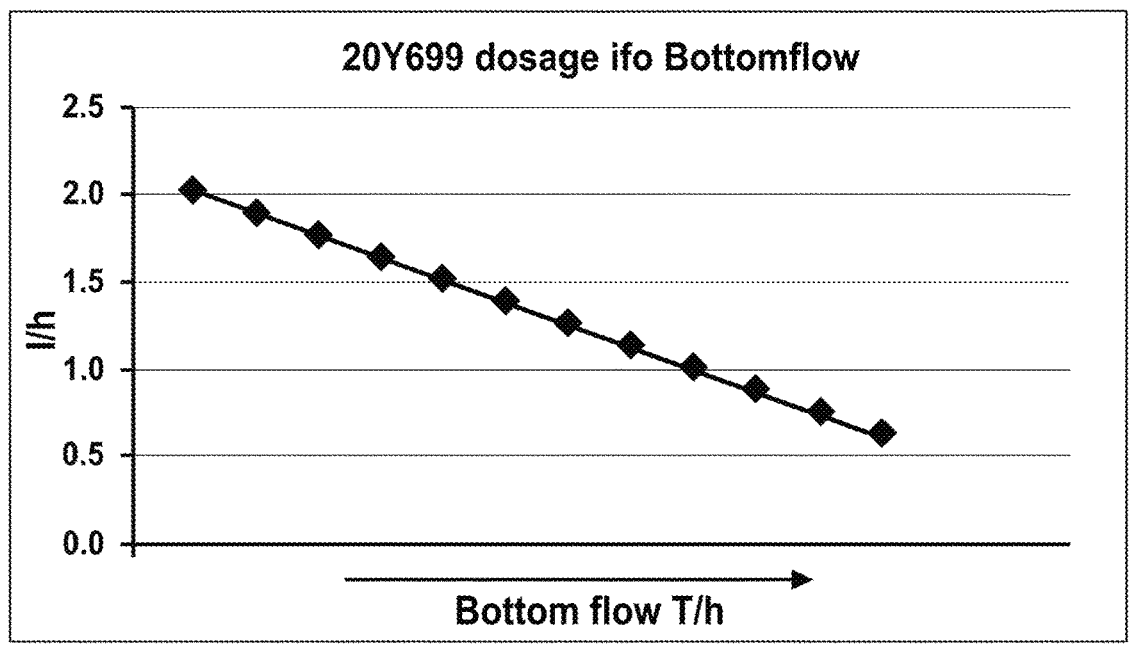
Figure 6B:
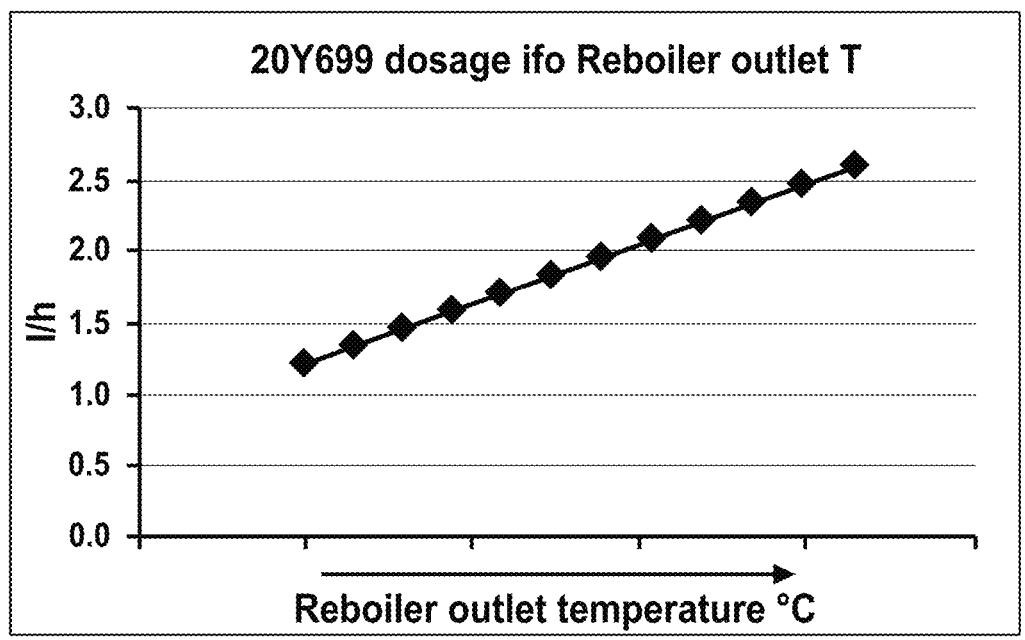

FIGS. 6A and 6B are line graphs showing the relationship between antifoulant dosages and flow rate (FIG. 6A) or temperature (FIG. 6B) at the bottom of a condensate stripper.

Figure 7A:
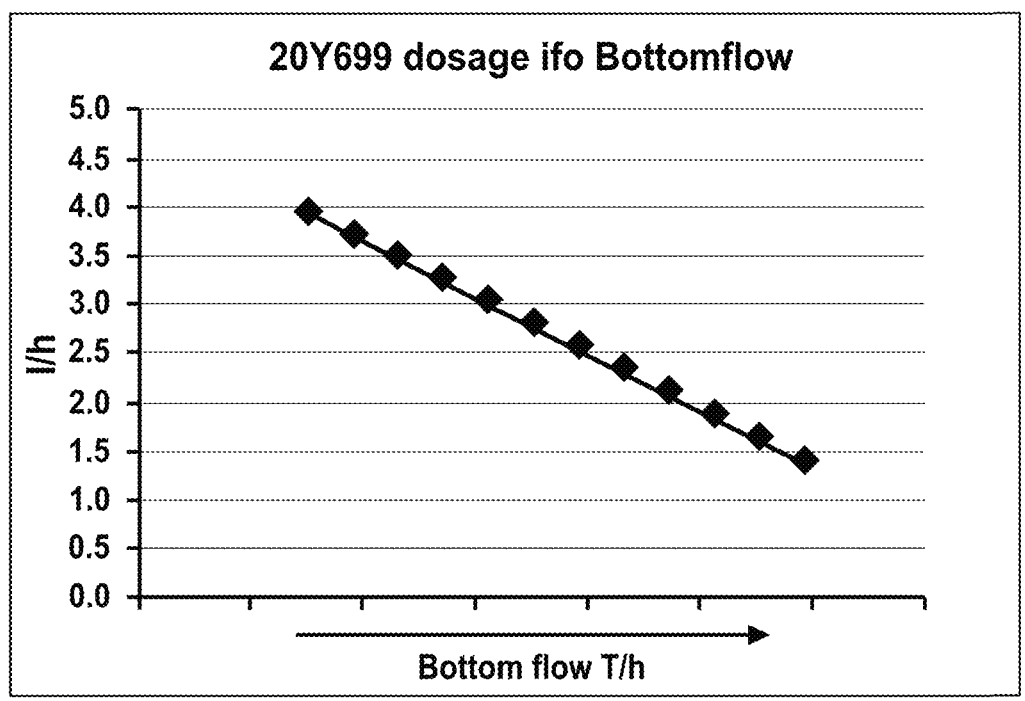
Figure 7B:
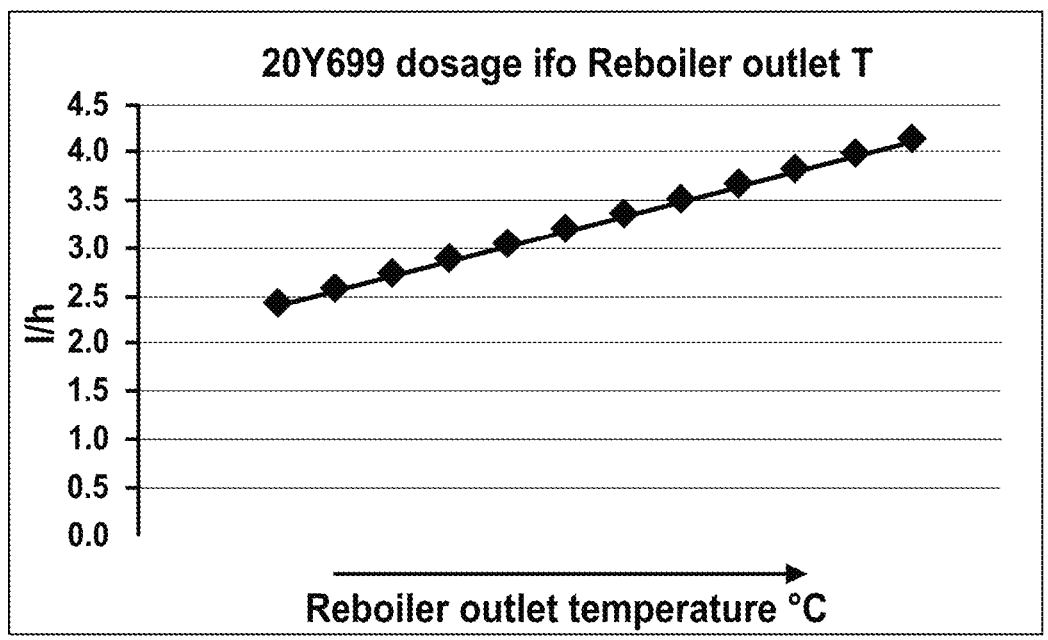

FIGS. 7A and 7B are line graphs showing the relationship between antifoulant dosages and flow rate (FIG. 7A) or temperature (FIG. 7B) at the bottom of a deethanizer.

Figure 8:
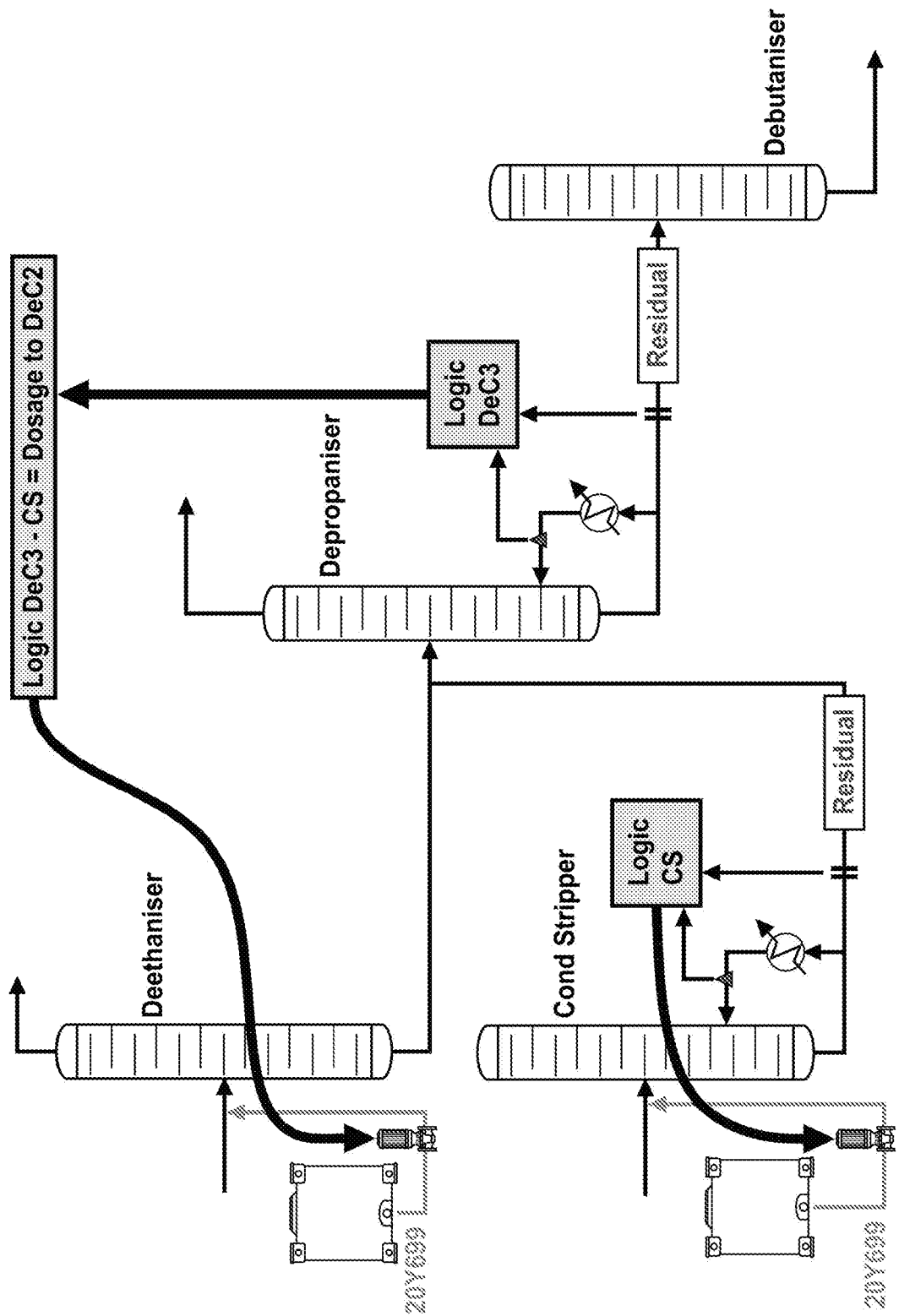

FIG. 8 is a schematic drawing showing implementation of a determined antifoulant treatment protocol in a typical fractionation train of an ethylene plant.

Figure 9A:
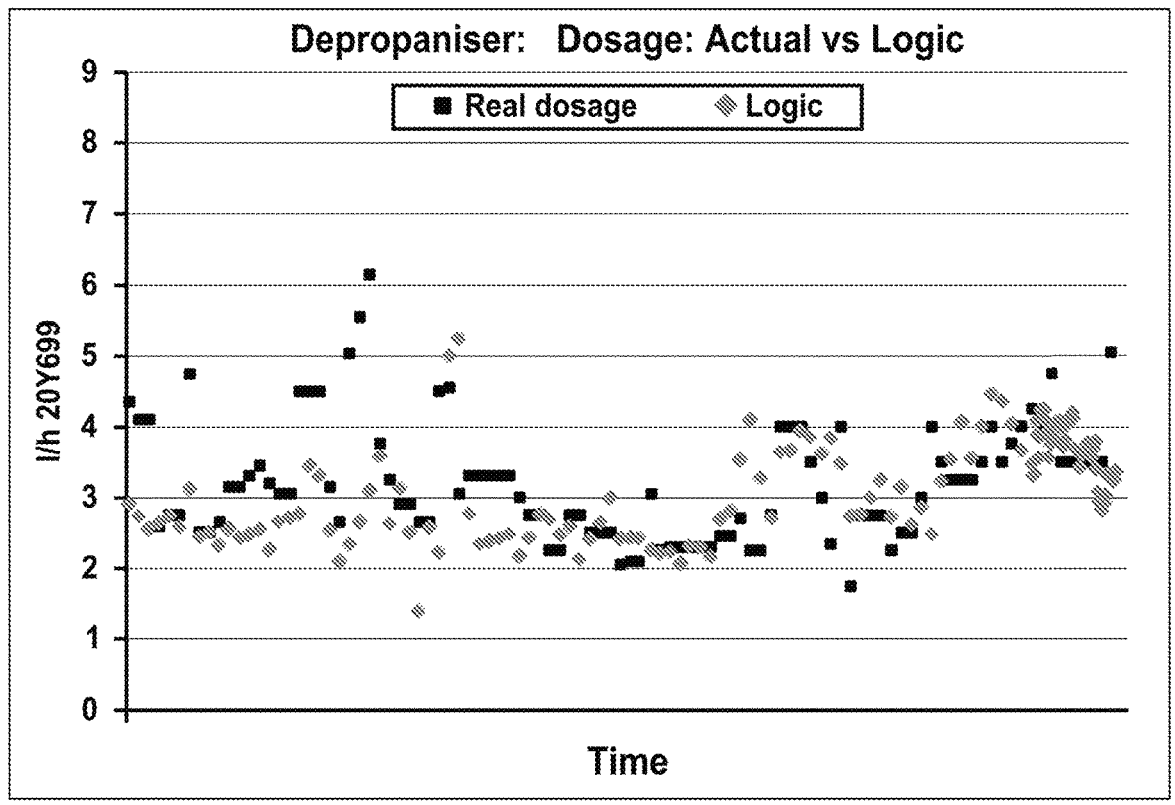
Figure 9B:
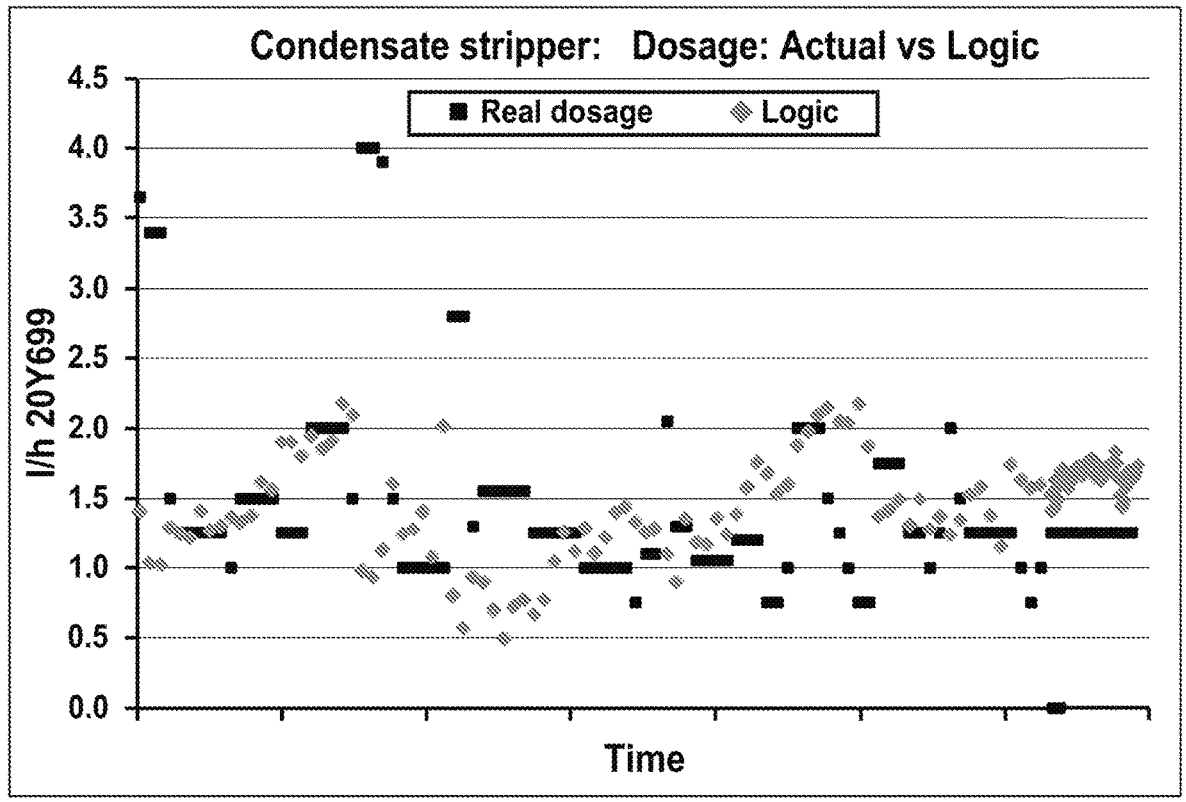

FIGS. 9A and 9B are scatter plots showing correlation between determined antifoulant treatment protocols calculated using the algorithm disclosed herein and by conventional practice.

DETAILED DESCRIPTION

Before the present methods and systems are disclosed and described, it is to be understood that the methods and systems are not limited to specific methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As used herein, the term "fouling" refers to the accumulation of a phase separate from the mobile phase on the surfaces of refinery equipment. For instance, non-gaseous material can separate from a gaseous mobile phase and non-liquid material can separate from a liquid mobile phase. The separated phase reduces the space through which the hydrocarbon can pass, and reduces the contact between the hydrocarbon and heat exchanger surfaces.

As used herein, the term "mitigation" encompasses, without limitation, fouling reduction, fouling buffering, and fouling prevention.

As used herein, the term "hydrocarbon composition" or "hydrocarbon sample" refers to crude oil, crude oil blends, tower bottoms, gas oil, naphtha, condensates, slop oil, hydrotreated oil, hydrocracked oil, liquified cracked gas and mixtures thereof.

The present methods and systems may be understood more readily by reference to the following detailed description of preferred embodiments and the Examples included therein and to the Figures and their previous and following description.

Methods

Provided herein are methods of fouling mitigation in a hydrocarbon fractionation column by monitoring operating parameters in the hydrocarbon fractionation column. The hydrocarbon fractionation column embodies fractionation columns used for separating a hydrocarbon stream with at least one alkane component and at least one olefin component. A plurality of hydrocarbon fractionation columns can be present and arranged in parallel and/or series. Such arrangement is conventionally referred to as a hydrocarbon fractionation train.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to schematic illustrations of the methods and systems. It will be understood that each schematic illustration can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the illustrations.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the illustrations. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the illustrations.

Accordingly, illustrations support combinations of means for performing the specified functions, combinations of steps for performing the specified functions and program instruction means for performing the specified functions. It will also be understood that each illustration, and combinations of illustrations, can be implemented by special purpose hardware-based computer systems that perform the specified functions or steps, or combinations of special purpose hardware and computer instructions.

Figure 1:
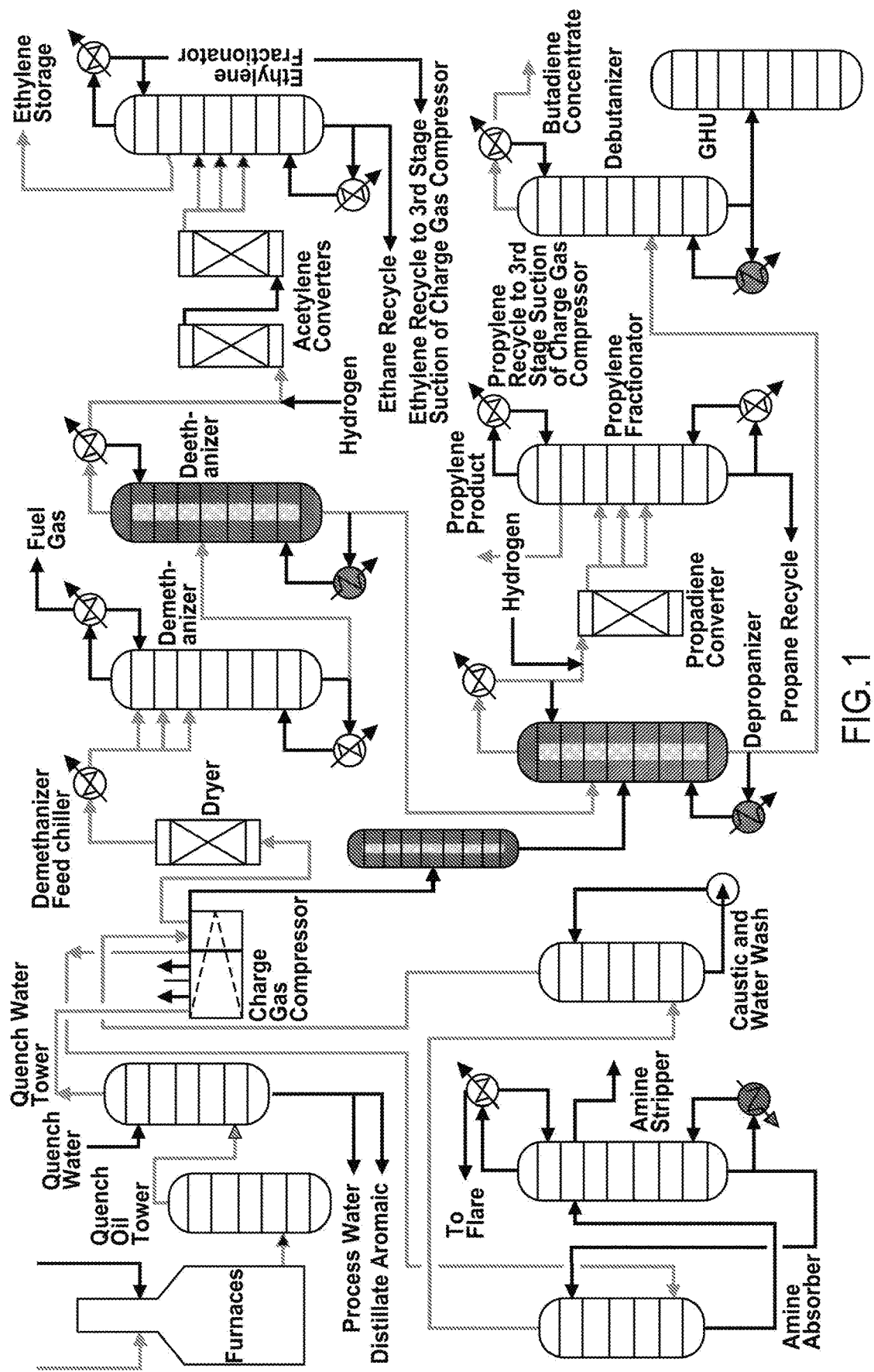
FIG. 1 is a schematic diagram showing a typical ethylene plant.

FIG. 1 is a high-level illustration of a typical hydrocarbon refinery for recovering olefins. In FIG. 1, a feedstock is fed to a series of separation (fractionation) columns. In the demethanizer column, methane is obtained from the top, while the bottom stream is fed to a deethanizer column. The top of the deethanizer column, composed primarily of ethylene and ethane, is fed to an acetylene converter and then fractionated in the C2-splitter. In this column, lights are removed from the overheads and recycled to the compression system, while polymer-grade (PG) ethylene is drawn from the column as a side stream. Ethane, from C2-splitter bottoms, is recycled to the cracking furnaces. The deethanizer bottom stream is fed to a depropanizer column, which distills C3 components in the overheads. This overhead stream is catalytically hydrotreated for methyl acetylene and propadiene removal, and then fed to the C3-splitter. In this column, lights are removed from the overheads and recycled to the compressors, while polymer-grade (PG) propylene is drawn from the column as a side stream. Propane from C3-splitter bottoms is recycled to the cracking furnaces. A C4+ stream is obtained from the depropanizer bottom stream. The C4+ rich stream can be further processed in a debutanizer column to produce one or more of butadiene, n-butane, and isobutene which leaves the debutanizer column as overhead product. C5+ and heavier materials join the debutanizer bottom stream and leave the debutanizer and flow to the gasoline hydrogenation unit (GHU).

Figure 2:
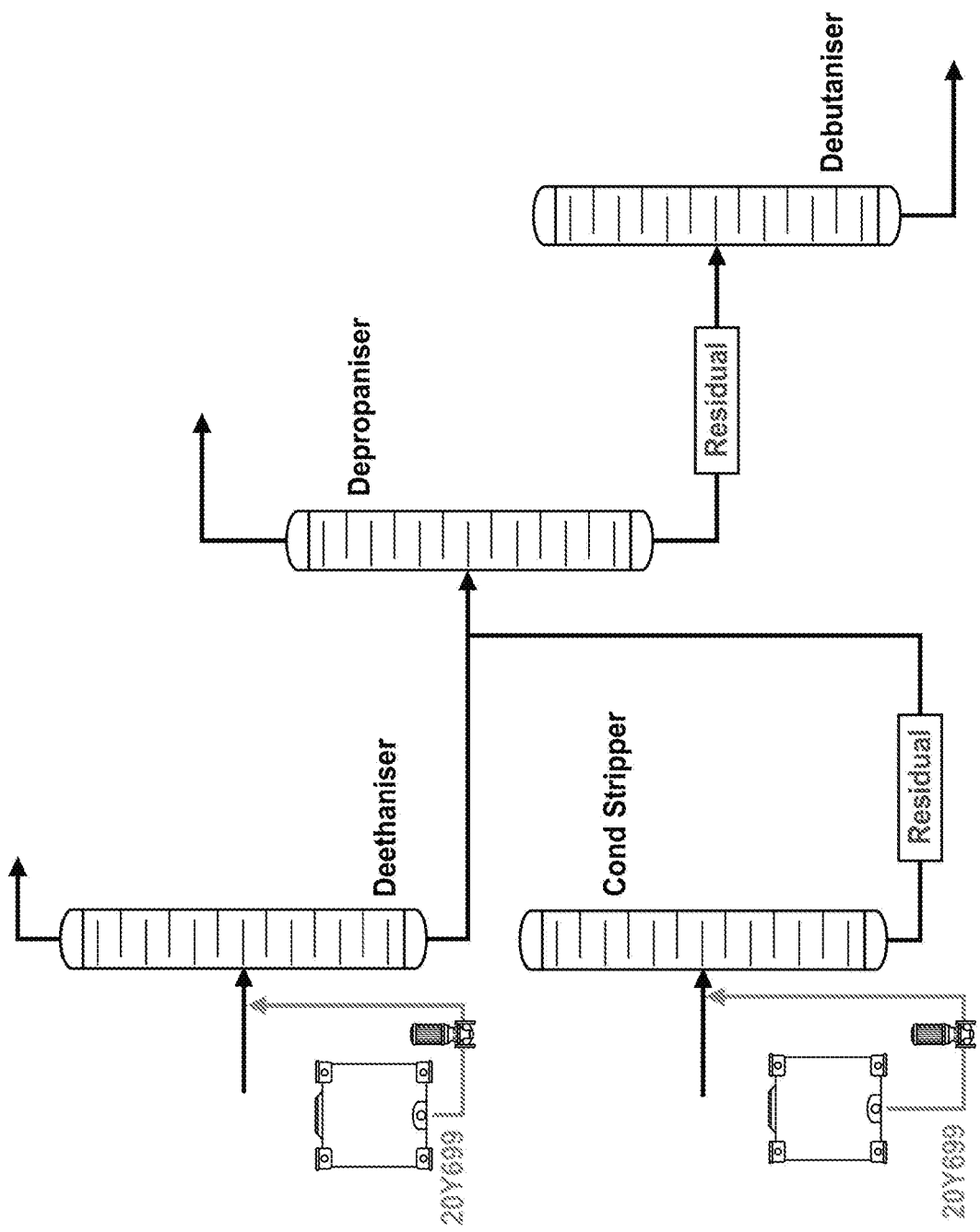
FIG. 2 is a schematic drawing showing a typical fractionation train of an ethylene plant.

In some embodiments, the hydrocarbon refinery can further include a condensate stripper. Referring now to FIG. 2, a schematic of an exemplary hydrocarbon fractionation train in a hydrocarbon refinery including a condensate stripper is shown. A first feedstock can be fed to a deethanizer (DeC2) and a second feedstock can be fed to a condensate stripper (CS). In the condensate stripper, heavier fractions are recovered at the bottom stream. The deethanizer bottom stream and condensate stripper bottom stream are fed to the depropanizer (DeC3) to separate C3 components from C4 and heavier components. A C4+ stream is obtained from the depropanizer bottoms. The C4+ rich stream can be further processed in a debutanizer (DeC4) to produce one or more of butadiene, n-butane, and isobutene which leaves the debutanizer as overhead product.

Fouling in fractionation columns can be a serious operating difficulty. For example, in most ethylene refineries, the deethanizer and/or depropanizer columns can become the primary bottleneck for operating the refinery at maximum throughput and maximum service time. In specific examples, when NGL's are cracked, fouling occurs in the deethanizer and depropanizer columns and in the condensate stripper when used. When naphtha/gas oils are cracked, the overall fouling potential in distillation (fractionation) columns may be less than typically seen in NGL crackers. In some cases deethanizers are untreated due to minimal fouling tendency. Depropanizers, however, require some form of antifoulant treatment because of high butadiene concentration in the column bottom stream, which can form polybutadiene rubber. Debutanizers may also require treatment if additional free radicals are generated by heat in the column bottom stream.

Figure 3:
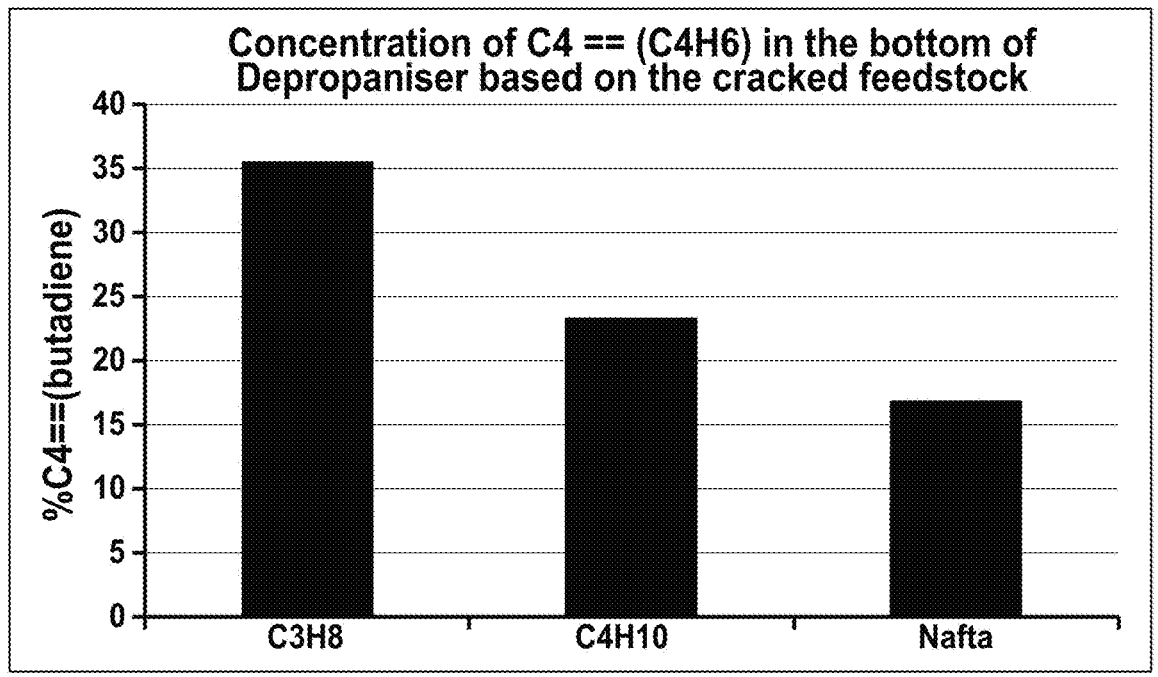
FIG. 3 is a bar graph showing the concentration of butadiene in a bottom stream of a depropanizer as a function of the feedstock.

Several factors are known to affect the rate and fouling potential of a fractionation column. In particular, long residence time of the hydrocarbons in the columns have been known to increase fouling. Vapor ($C_3H_8$ (C3) and $C_4H_{10}$ (C4)) cracking increases residence time, oxygenates, and butadiene concentration in the fractionation columns. FIG. 3 shows the percent of cracked gas in the bottom streams of a fractionation train (including a condensate stripper (CS), a deethanizer (DeC2), a depropanizer (DeC3), and a debutanizer (DeC4)). For the condensate stripper, the depropanizer, and the debutanizer, the percent cracked gas is significantly less for vapor (C3 and C4) feeds than for naphtha feed. Accordingly, the condensate stripper, the depropanizer, and the debutanizer would exhibit a higher fouling tendency due to longer residence time during vapor cracking. The deethanizer generally exhibits a higher amount of cracked gas, independent of the feed, and therefore has a lower fouling tendency due to shorter residence time of the vapor gas.

Figure 4:
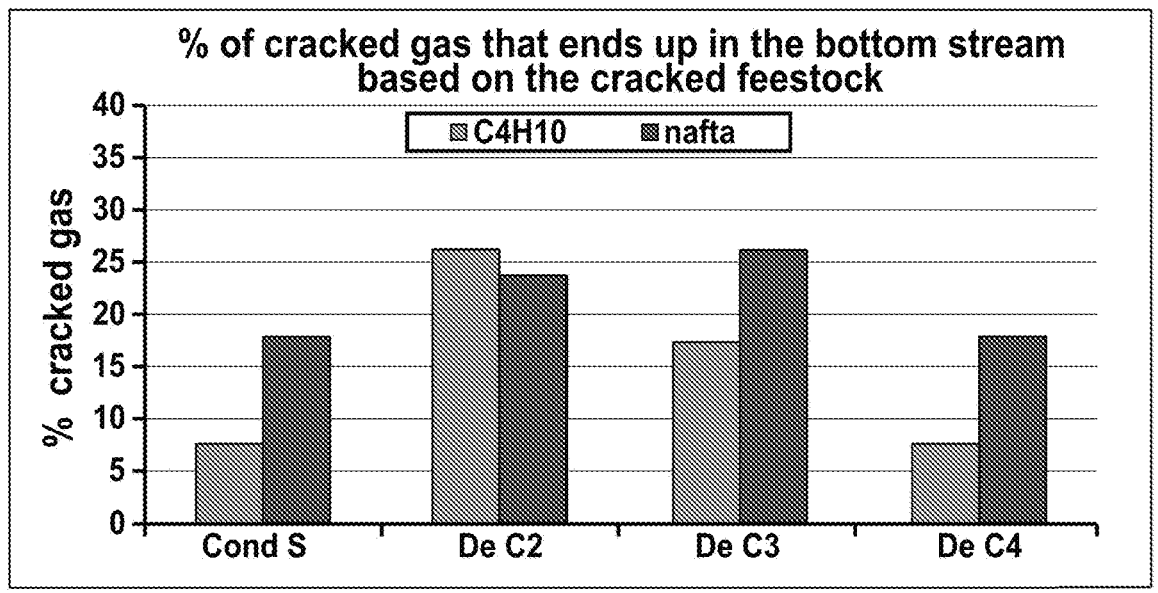
FIG. 4 is a bar graph showing the % cracked gas in a bottom stream as a function of the feedstock in various fractionation column.

The fouling rate of the fractionation column also increases when the diolefin concentration in the column bottom stream increases. FIG. 4 shows the butadiene concentration in the bottom stream of a depropanizer. The butadiene concentration in the depropanizer increases when cracking C4 alkanes compared to naphtha, and increases even more significantly when cracking C3 alkanes. Thus, the depropanizer would require some form of antifoulant treatment because of high butadiene concentration in the column bottom stream which can form polybutadiene rubber. Debutanizers may also require treatment if additional free radicals are generated by heat in the column bottoms.

FIGS. 5A-5C show the effect of temperature on fouling rate and reaction rate of oxygenates present in a fractionation column. FIG. 5B shows as the bottom temperature increases from less than 85° C. to 85-100° C. to greater than 100° C., the fouling potential increases from low to moderate to high. The temperature also has a direct bearing on the rate of free radical formation and inhibitor consumption as shown in FIG. 5C. Polymer formation is a function of the rate at which propagating free radicals can be terminated. This is why inhibitors are used.

Overall, as temperature and residence time increase, the fouling rate tracks more along a logarithmic path than a linear function. Other factors affecting fouling include oxygen content. Contamination of the feedstock with oxygen will result in peroxide formation which further increases fouling rate when heated. Transition metals such as iron and copper, also catalyze polymerization. Iron catalyzes the decomposition of peroxides into peroxy radicals and can increase the rate of Diels-Alder reactions that generate initiators.

As disclosed herein, the inventor has discovered that fouling can be correlated to measured operating parameters in a hydrocarbon fractionation column, specifically to the flow rate (1/flow~residence time) and temperature at the bottom of the fractionation column. The inventor has further developed methods and systems based on temperature and flow rate data to mitigate fouling in the hydrocarbon fractionation column.

In the methods of fouling mitigation disclosed herein, the methods include measuring a temperature and a flow rate of a bottom stream of the fractionation column. The "bottom stream" of a fractionation column is well understood in the art. In some instances, the temperature and flow rate of the "bottom stream" are continuously measured in the typical operation of a hydrocarbon fractionation column and thus readily available. However, a typical specification for the "bottom stream" is to have in possession of a ratio of the "top" product (product exiting the overhead compartment): "bottom" product (product exiting the bottom compartment) of from 2:1 to 1:10 on a volume basis. For example, a typical specification for the "bottom stream" of a depropanizer is to comprise a ratio of C3:C4+ of 1:1 on a volume basis.

The temperature can be measured before the bottom stream exits the fractionation column, at an outlet of the fractionation column or at the outlet of the reboiler. An analyzer is used to measure the temperature of the bottom stream. In one non-limiting example, the analyzer for measuring the temperature of the bottom stream comprises a thermometer. It is to be appreciated; however, that other analyzers may be used. The temperature of the bottom stream is directly related to the polymerization rate and the charge of the fractionation column.

The flow rate can be measured after the bottom stream exits the fractionation column. An analyzer is used to measure the flow rate of the bottom stream. In one nonlimiting example, the analyzer for measuring the flow rate of the bottom stream is a flow meter. It is to be appreciated; however, that other analyzers may be used. The flow rate of the bottom stream is directly related to the residence time (1/flow~residence time). The flow rate of the bottom stands in relation with total flow rate of feed to the steam cracker and the percentage of vapor (C2-C4) cracking.

The temperature and flow rate of the bottom stream of the fractionation column can be measured on a continuous basis using the analyzers.

In the methods of fouling mitigation disclosed herein, the methods can include providing the measured temperature and flow rate to a processing device. As used herein, processing device refers to a physical hardware device that executes encoded instructions for performing functions on inputs and creating outputs. The processing device may be integrated with and into the analyzer, or it may be separate from the analyzer. For example, the processing device may be a portion of a control system and may comprise a programmable logic controller (PLC), a computer, distributed control system (DCS), a field-programmable gate array (FPGA), and the like. In one aspect, the processing device may comprise a plurality of processors that are in communication with one another. For example, the processor of the analyzer may be in communication with the processor of a control system.

Though the analyzer measures the temperature and flow rate of the bottom stream, it is to be appreciated that the temperature or flow rate may be measured at other locations in the fractionation column. For example, the flow rate and temperature can be measured by the analyzer at an inlet or within the fractionation column for comparative purposes. In some instances, the measured flow rate and temperature provided to the processing device includes the flow rate and temperature measured at an inlet, within, or at a bottom of the fractionation column.

The methods of fouling mitigation disclosed herein can include determining, by the processing device, based on the measured temperature and flow rate of the bottom stream, an antifoulant treatment protocol for the fractionation column. As disclosed herein, the inventor has developed an algorithm based on the measured temperature and flow rate that controls the feeding of antifoulants (inhibitors) to the fractionation column to mitigate fouling. The algorithm based on the measured temperature and flow rate that controls the feeding of antifoulant to the fractionation column can be according to the equation:

$$1/h_{(column\ x)} = M + (x - y*A) + (B - w)*z,$$

wherein $1/h_{(column\ x)}$ is the antifoulant flow rate in the column (in units of liter/hour);

M is a minimum antifoulant dosage (in units of liter/hour);

A is a bottom flow rate (tons/hour, T/h) of the bottom stream;

B is temperature (° C.) of the bottom stream;

x and y are specific parameters that determine the impact of A (flow rate of the bottom stream) on the antifoulant flow rate (l/h);

z and w are specific parameters that determine the impact of B (temperature of the bottom stream) on the antifoulant flow rate (l/h).

M, the minimum antifoulant dosage can be determined following conventional fouling mechanisms. For example, the fouling potential index can automatically establish the minimum antifoulant dosage range, based on the most effective antifoulant product formulation. For unconventional fouling mechanism, a customized antifoulant program can be designed based on relevant column parameters and unit operations. The specific column and the type of chemistry drives the antifoulant dosage range. The minimum antifoulant dosage, M, can range from 0.5 to 3 l/h or from 0.75 to 1.5 l/h. In some embodiments, the minimum antifoulant dosage, M, can be about 0.75 l/h.

As discussed herein, A, the flow rate of the bottom stream is a measured parameter and is provided in tons/hour (T/h). The flow rate, A, can be measured by an analyzer.

B, the temperature of the bottom stream is also a measured parameter and is provided in degrees Celsius (° C.). The temperature, B, can be measured by an analyzer.

x and y are specific parameters that determine the impact of A (flow rate of the bottom stream) on the antifoulant flow rate (l/h). As described herein, the flow rate of the bottom stream is directly related to the residence time (1/flow~residence time) and the percent vapor (C2-C4) cracking, which consequently affects fouling. Accordingly, the specific parameters (x and y) that determine the impact of flow rate of the bottom stream on the antifoulant flow rate include the residence time of the bottom stream and the percent C2-C4 cracking (i.e., percent cracked gas in the bottom stream).

z and w are specific parameters that determine the impact of B (temperature of the bottom stream) on the antifoulant flow rate (l/h). As described herein, the temperature of the bottom stream is directly related to the polymerisation rate and the charge to the fractionation column. Accordingly, the specific parameters (z and w) that determine the impact of temperature of the bottom stream on the antifoulant flow rate include the polymerization rate in the bottom stream and the charge.

FIGS. 6A-6B are graphs depicting an antifoulant treatment protocol for a depropanizer column (DeC3). Specifically, FIGS. 6A and 6B depict antifoulant dosages (l/h) as a function of the temperature and flow rate of the bottom stream in a depropanizer column (DeC3). The antifoulant dosages (l/h) for the depropanizer were calculated using the equation:

$$1/h_{(DeC3)} = 0.6 + (1.25 - 0.064*A) + (B - 100)*0.042,$$

wherein $1/h_{(DeC3)}$ is antifoulant flow rate in the depropanizer column (in units of l/h); A is flow rate (T/h); and B is temperature (° C.).

FIGS. 7A-7B are graphs depicting an antifoulant treatment protocol for a condensate stripper (CS). Specifically, FIGS. 7A and 7B depict antifoulant dosages (l/) as a function of the temperature and flow rate of the bottom stream in a condensate stripper (CS). The antifoulant dosages (l/h) of the condensate stripper were calculated using the equation:

$$1/h_{(cs)} = 1.28 + (2.9 - 0.058*A) + (B - 92)*0.078,$$

wherein $1/h_{(cs)}$ is antifoulant flow rate in the condensate stripper (in units of l/h); A is flow rate (T/h); and B is temperature (° C.).

In other specific examples, the antifoulant treatment protocol for a deethanizer column (DeC2) can be calculated according to the equation:

$$1/h_{(DeC2)} = 1/h_{(DeC3)} - 1/h_{(cs)},$$

wherein $1/h_{(DeC2)}$ is antifoulant flow rate in the deethanizer column (in units of l/h).

The methods of fouling mitigation in a fractionation column described herein can comprise treating the fractionation column by controlling, by the processing device, a feed control unit in accordance with the determined antifoulant treatment protocol. In some instances, treating the fractionation column by controlling, by the processing device, the feed control unit in accordance with the determined antifoulant treatment protocol can comprise the feed control unit adding an antifoulant to the fractionation column. "Antifoulant" is a generic term for formulation components that can include antioxidants, antipolymerants, and metal deactivator. Polymerization inhibitors most often provide the most effective solution to fouling. The specific fractionation columns affected and the actual fouling potential is a direct function of the feedstock being cracked. The added antifoulants may comprise a dialkylhydroxylamine, diarylhydroxylamine, a hydroxyalkylhydroxylamine, a hydroxylalkyl hydroxylamine, an alkylated hydroxytoluene, an aryldiamine, a hydroxyalkylpiperidinoxyl, or a mixture thereof The antifoulant may be added upstream the fractionation column, that is upstream a point where the flow rate and temperature of the bottom stream are measured. For example, the antifoulant may be added to the feed stream that is upstream of a point where the flow rate and temperature of the bottom stream are measured. In some cases, when the inlet temperature of the DeC2 is low, the antifoulant can be injected in the column at a tray below the inlet distributor.

In one aspect, the processing device may be used to control one or more aspects of processing upstream or downstream of the fractionation column based on the measured flow rate and temperature.

FIG. 8 illustrates an exemplary method of fouling mitigation. The condensate stripper receives a stream of hydrocarbon from a processing plant, wherein the stream of hydrocarbon enters an inlet into the condensate stripper. An analyzer measures at least the flow rate and temperature of the bottom stream in the condensate stripper. The measured flow rate and temperature are provided by the analyzer to a processing device, wherein based on the measured flow rate and temperature in the bottom stream, the processing device executes a treatment protocol for the condensate stripper comprising controlling a feed control unit in accordance with the determined treatment protocol. As noted herein, the processing device may be integrated with and into the analyzer or it may be separate from the analyzer. Generally, treating the condensate stripper by controlling, by the processing device, the feed control unit in accordance with the determined treatment protocol comprises the feed control unit adding antifoulant to the condensate stripper.

Similarly, the depropanizer receives a stream of hydrocarbon from the condensate stripper and/or deethanizer, wherein the stream of hydrocarbon enters an inlet into the depropanizer. An analyzer measures at least the flow rate and temperature of the bottom stream in the depropanizer. The measured flow rate and temperature are provided by the analyzer to a processing device, wherein based on the measured flow rate and temperature in the bottom stream, the processing device executes a treatment protocol for the depropanizer comprising controlling a feed control unit in accordance with the determined treatment protocol. Generally, treating the depropanizer by controlling, by the processing device, the feed control unit in accordance with the determined treatment protocol comprises the feed control unit adding antifoulant to the depropanizer.

The deethanizer receives a stream of hydrocarbon from a processing plant, wherein the stream of hydrocarbon enters an inlet into the deethanizer. An analyzer measures at least the flow rate and temperature of the bottom stream in the deethanizer. The measured flow rate and temperature are provided by the analyzer to a processing device, wherein based on the measured flow rate and temperature in the bottom stream, the processing device executes a treatment protocol for the deethanizer comprising controlling a feed control unit in accordance with the determined treatment protocol. Alternately, the treatment protocol for the deethanizer can be determined based on the treatment protocol for the condensate stripper and depropanizer and as described herein. Generally, treating the deethanizer by controlling, by the processing device, the feed control unit in accordance with the determined treatment protocol comprises the feed control unit adding antifoulant to the deethanizer.

Systems

Systems for fouling mitigation are also described herein. The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for treating wastewater. In one exemplary aspect, the units can comprise a processing device that comprises a processor as described below.

In various aspects, the processing device may comprise all or a portion of the analyzer and/or a control system. As used herein, "processing device" may include a plurality of processing devices. The processing device may include one or more hardware components such as, for example, a processor, a random access memory (RAM) module, a read-only memory (ROM) module, a storage, a database, one or more input/output (I/O) devices, and an interface. Alternatively and/or additionally, the processing device may include one or more software components such as, for example, a computer-readable medium including computer executable instructions for performing a method associated with the exemplary embodiments. It is contemplated that one or more of the hardware components listed above may be implemented using software. For example, storage may include a software partition associated with one or more other hardware components. It is understood that the components listed above are exemplary only and not intended to be limiting.

The processor may include one or more processors, each configured to execute instructions and process data to perform one or more functions associated with a processing device for treating wastewater. Processor may be communicatively coupled to RAM, ROM, storage, database, I/O devices, and interface. Processor may be configured to execute sequences of computer program instructions to perform various processes. The computer program instructions may be loaded into RAM for execution by processor.

RAM and ROM may each include one or more devices for storing information associated with operation of processor. For example, ROM may include a memory device configured to access and store information associated with processing device, including information for identifying, initializing, and monitoring the operation of one or more components and subsystems. RAM may include a memory device for storing data associated with one or more operations of processor. For example, ROM may load instructions into RAM for execution by processor.

Storage may include any type of mass storage device configured to store information that processor may need to perform processes consistent with the disclosed embodiments. For example, storage may include one or more magnetic and/or optical disk devices, such as hard drives, CD-ROMs, DVD-ROMs, or any other type of mass media device.

Database may include one or more software and/or hardware components that cooperate to store, organize, sort, filter, and/or arrange data used by processing device and/or processor. For example, database may store an algorithm for determining antifoulant dosage of the fractionation column based on measured flow rate and temperature of the bottom stream. Database may also store information associated with a method of fouling mitigation using a flow rate and temperature analyzers comprising receiving, from an analyzer, measured temperature and flow rate for a bottom stream of a hydrocarbon fractionation column; determining, based on the measured temperature and flow rate in the stream, an antifoulant treatment protocol for the stream; and treating the hydrocarbon fractionation column by controlling a feed control unit in accordance with the determined antifoulant treatment protocol.

I/O devices may include one or more components configured to communicate information with a user associated with processing device. For example, I/O devices may include a console with an integrated keyboard and mouse to allow a user to maintain an algorithm for determining antifoulant dosage of the fractionation column based on measured flow rate and temperature of the bottom stream, software for treating the hydrocarbon fractionation column by controlling a feed control unit in accordance with the determined antifoulant treatment protocol, and the like. I/O devices may also include a display including a graphical user interface (GUI) for outputting information on a monitor. I/O devices may also include peripheral devices such as, for example, a printer for printing information associated with processing device, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface may include one or more components configured to transmit and receive data via a communication network, such as the Internet, a local area network, a workstation peer-to-peer network, a direct link network, a wireless network, or any other suitable communication platform. For example, interface may include one or more modulators, demodulators, multiplexers, demultiplexers, network communication devices, wireless devices, antennas, modems, and any other type of device configured to enable data communication via a communication network.

In some specific examples, the systems for fouling mitigation in a hydrocarbon fractionation column can include a) a hydrocarbon fractionation column; b) one or more analyzers, wherein the one or more analyzers measure a temperature and a flow rate of a bottom stream in the hydrocarbon fractionation column; and c) a processing device in communication with the analyzer and a feed control unit. The processing device receives the measured temperature and flow rate from the one or more analyzers; determines, based on the measured temperature and flow rate in the stream, an antifoulant treatment protocol for the hydrocarbon fractionation column; and treats the hydrocarbon fractionation column by controlling the feed control unit in accordance with the determined antifoulant treatment protocol. In some embodiments, the feed control unit comprises a pump which receives an electrical signal corresponding to the determined antifoulant treatment protocol, preferably a calculated dosage of antifoulant, the pump having a controller to vary its pumping rate, the controller varying the pumping rate of the antifoulant being pumped directly into the hydrogen fractionation column as a result of receiving the electrical signal.

In other specific examples, the systems for fouling mitigation in a hydrocarbon fractionation column comprises a non-transitory computer program product comprising computer-executable control logic for executing by a processor, said computer-executable control logic causing the processor to a) receive, from an analyzer, measured temperature and flow rate for a bottom stream of a hydrocarbon fractionation column; b) determine, based on the measured temperature and flow rate in the bottom stream, an antifoulant treatment protocol for the hydrocarbon fractionation column; and c) treat the hydrocarbon fractionation column by controlling a feed control unit in accordance with the determined antifoulant treatment protocol.

The systems can also be used to provide computer-assisted method of fouling mitigation in a hydrocarbon fractionation column. The computer can include at least one processing device and a non-transitory memory unit comprising a control logic that, when executed by the at least one processing device, causes the at least one processing device to perform the computer-assisted method. The computer-assisted method of fouling mitigation can include a) measuring, by at least one analyzer, a temperature and a flow rate in a bottom stream from the hydrocarbon fractionation column; and b) providing the measured temperature and a flow rate to the processing device, wherein based on the measured temperature and flow rate in the bottom stream, the processing device executes, by the control logic, an antifoulant treatment protocol for the hydrocarbon fractionation column comprising controlling a feed control unit in accordance with the determined antifoulant treatment protocol.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

The processing device can be used to determine a treatment protocol for the stream of the hydrocarbon fractionation column. For example, the processing device can execute an algorithm in a feed forward/feedback control strategy to automatically adjust an antifoulant feed of a feed control unit to the fractionation column to ensure continuous effective antifoulant dosing in accordance with the determined treatment protocol.

EXAMPLE

Table 1 shows a comparison of the antifoulant dosage rate before logic implementation (conventional determination) and after manual logic implementation in a condensate stripper (CS) and depropanizer (DeC3). Manual means that the dose rate is weekly adjusted based on the logic calculation (no automation). A significant reduction in the number of times that the dose rate of the related product is too high or too low compared to the projected dose rate based on the logic is achieved by the implementation of the logic. This results in a more efficient use of antifoulant.

TABLE 1

Antifoulant dosing to condensate stripper

| Dosage condensate stripper | Before logic implementation | After logic implementation |
|---|---|---|
| Overdosing | 19% | 56% |
| Dosing OK IRT logic | 17% | 36% |
| Dose rate insufficient | 64% | 8% |

Overdosing = actual dosage > calculated dosage based on logic × 1.1

Insufficient dosing=actual dosage<calculated dosage based on logic×0.9

Summary related to the condensate stripper: the number of times that antifoulant dose rate was within desired range increased from 17 to 36%.

TABLE 2

Antifoulant dosing to depropanizer

| Dosage depropanizer | Before logic implementation | After logic implementation |
|---|---|---|
| Overdosing | 42% | 26% |
| Dosing OK IRT logic | 24% | 45% |
| Dose rate insufficient | 34% | 29% |

Summary related to the depropanizer: the number of times that antifoulant dose rate was within desired range increased from 24 to 45%.

Table 3 shows the average run length of various fractionation columns before logic implementation (conventional determination) and after manual logic implementation.

TABLE 3

Run lengths of condensate stripper column & reboiler

| Average run length | Before logic implementation | After logic implementation |
|---|---|---|
| Column condensate stripper | 702 | 1278* |
| Reboiler condensate stripper | 140 | 451* |

*still running

The introduction of the logic and consequent reduction in the number of times that the antifoulant dose rate is too low compared to the projected dose rate based on the logic results in an increase of the run lengths of the related columns and reboilers. The run length of the column and reboiler increased respectively by 82% and 222%.

The methods and systems of the appended claims are not limited in scope by the specific methods and compositions described herein, which are intended as illustrations of a few aspects of the claims and any methods and systems that are functionally equivalent are within the scope of this disclosure. Various modifications of the methods and systems in addition to those shown and described herein are intended to fall within the scope of the appended claims. Further, while only certain representative methods, systems, and aspects of these methods and systems are specifically described, other methods and systems and combinations of various features of the methods and systems are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

The invention claimed is:

1. A computer-assisted method of fouling mitigation in a hydrocarbon fractionation column, wherein the method utilizes a computer comprising at least one processing device and a non-transitory memory unit comprising a control logic that, when executed by the at least one processing device, causes the at least one processing device to perform the method, the method comprising:

a) measuring, by at least one analyzer, a temperature and a flow rate in a bottom stream from the hydrocarbon fractionation column; and b) providing the measured temperature and the flow rate to the at least one processing device, wherein based on the measured temperature and flow rate in the bottom stream, the at least one processing device determines an antifoulant treatment protocol and executes by the control logic the determined antifoulant treatment protocol by controlling a feed control unit in accordance with the determined antifoulant treatment protocol such that the feed control unit supplies an antifoulant to the hydrocarbon fractionation column at a point upstream of the at least one analyzer.

2. The method of claim 1, wherein the at least one processing device is integrated with and/or into the at least one analyzer or the feed control unit.

3. The computer-assisted method of claim 1, wherein the determined antifoulant treatment protocol is according to the equation:

$$1/h_{(column\ x)} = M + (x - y^*A) + (B - w)^*z,$$

wherein $1/h_{(column\ x)}$ is antifoulant flow rate in the hydrocarbon fractionation column (in units of liter/hour, l/h);

M is a minimum antifoulant dosage in units of liter/hour;

A is a bottom flow rate (in units of tons/hour, T/h);

B is an outlet temperature (° C.).

x and y are specific parameters that determine the impact of A on the antifoulant flow rate (l/h); and z and w are specific parameters that determine the impact of B on the antifoulant flow rate (l/h).

4. The computer-assisted method of claim 1, the feed control unit comprises a pump which receives an electrical signal corresponding to the determined antifoulant treatment protocol, wherein the determined antifoulant treatment protocol comprises a calculated dosage of antifoulant, the pump having a controller configured to vary its a pumping rate of the pump in response to the electrical signal.

* * * * *